Nov. 23, 1926.
J. ENGL ET AL
1,608,261
PHOTOGRAPHIC SOUND RECORD REPRODUCING MEANS
Filed June 19, 1925
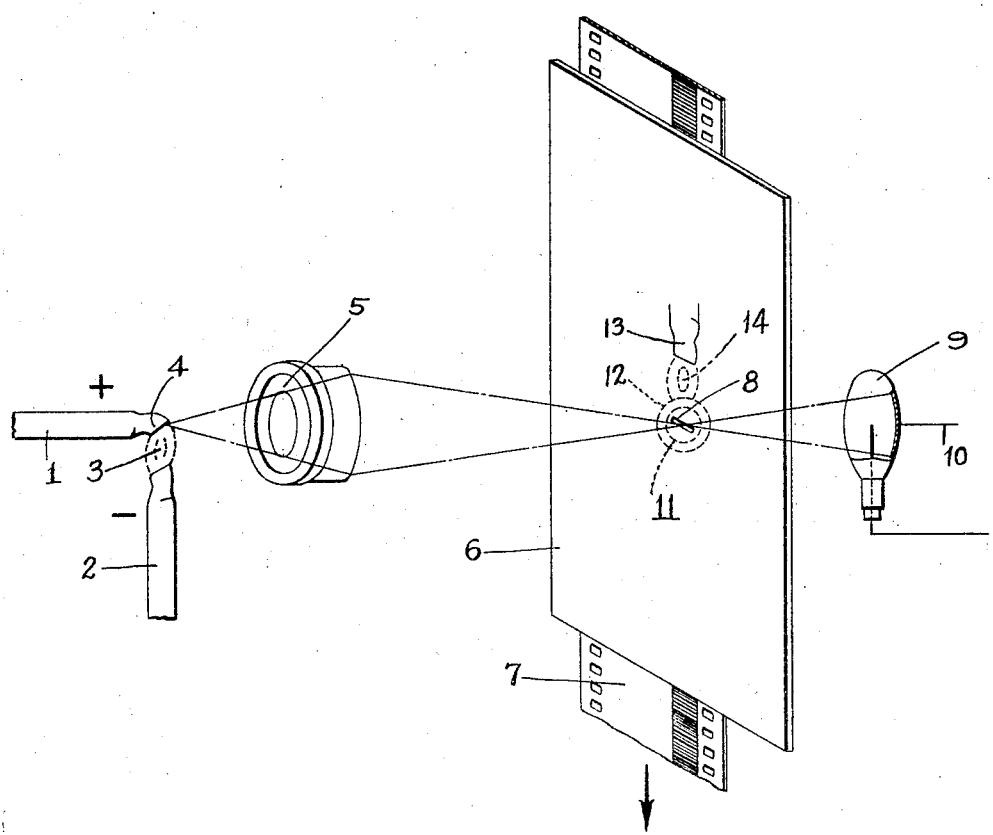
Inventors
Josef Engl
Hans Vogt, and
Joseph Massolle
By their Attorneys
Ward, Crosby and Smith Patented Nov. 23, 1926.

1,608,261

UNITED STATES PATENT OFFICE.

JOSEF ENGL, OF BERLIN-GRUNEWALD, HANS VOGT, OF BERLIN-WILMERSDORF, AND JOSEPH MASSOLLE, OF BERLIN-GRUNEWALD, GERMANY, ASSIGNORS TO TRI-ERGON, A.-G., OF ZURICH, SWITZERLAND, A CORPORATION OF SWITZERLAND.

PHOTOGRAPHIC-SOUND-RECORD REPRODUCING MEANS.

Application filed June 19, 1925. Serial No. 38,207.

The invention relates to improvements in photographic sound record reproducing means, and more particularly to means utilized in the reproduction of sound which is recorded photographically on a sensitized film or other light-sensitive carrier.

In the system, such as is contemplated herein, sound is recorded by causing the sound waves, by means of a microphone or the like, to set up acoustically-modulated currents in a circuit, which includes the microphone. These acoustically-modulated currents serve to modulate the intensity of illumination of a source of light. Light from this source, varying in intensity in correspondence with the original sound waves, passes through a narrow slit and falls upon a moving sensitized film whereon the sound record is made in the form of narrow lines extending transversely upon the film. The varying intensity of the recording light causes photographic blackening of the film of varying densities.

When the film has been developed and a positive film made therefrom, the latter is run at the same speed between a constant source of light and a light-sensitive element, such as a photoelectric cell. The varying quantities of light which pass through the film will set up currents in the circuit of the photo cell, which currents correspond to the variations of light impinging upon the photo cell, as is well known.

The present invention has to do with the form of light source which is utilized in reproducing the photographic sound records such as have just been described and with means for insuring the constancy of the illumination from this light source. In accordance with the invention the central portion only of the luminous face of the positive electrode of an electric arc is used as the source of light which is to illuminate the moving sound record film. This central portion of the positive crater, as it is termed, of the arc-discharge, is of an unvarying brilliance regardless of variations of the current flowing across the arc. In accordance with the invention provisions are made such that the outer marginal portions of the positive crater surface, as well as the luminescent portion of the arc itself and the negative pole of the arc are screened off so that no light from these portions of the electric arc source will be able to illuminate the film.

An object of the invention consists in the provision of means for illuminating the film with a constant intensity of light in accordance with the foregoing.

In order that the invention may be more clearly understood attention is hereby directed to the accompanying drawing forming a part of this application and illustrating an embodiment of the invention.

In the drawing the figure is a diagrammatic view partially illustrating a sound reproducing system comprising the invention.

It should be understood that photographic sound records may be made in the form of a succession of narrow lines extending transversely of the film, which lines are all of equal length but are of varying density or degree of blackening of the photographic emulsion so as to render the latter more or less opaque to the passage of light therethrough. That is the form of record particularly referred to above and which we prefer. A second form of record is well known, however, and can likewise be used in connection with the present invention, this being the form in which the transversely extending record lines on the film are of varying lengths so that one edge of the sound record thus formed is bounded by a varying curve as is well-known.

In the reproduction of photographic sound records, as contemplated herein, it is extremely important that the intensity of the light source employed should be made as strong as feasible and also that the same should be as constant as possible. The light should pass through a narrow slit and illuminate only one of the sound record lines on the film at a time, since if more than one such line is illuminated at a time the light passing through the film and falling upon the photo cell will correspond to more than one sound vibration and various sound frequencies thus will not be clearly reproduced. The width of the record line on the film which is thus to be illuminated may depend upon the rate of speed at which the film is progressed. The record line must be so narrow that at a given speed of travel of the film the vibrations of the highest sound frequencies which are to be recorded will be recorded singly and separately. The maximum audible sound frequency lies in the neighborhood of 10,000 vibrations per second. If the film travels at a speed 50 centimeters per second, for example, when sound of a frequency of 10,000 per second is to be recorded, each vibration corresponds to the product of 50 divided by 10,000 or 1/200ths of a centimeter of film. In other words, the sound record should be formed of transverse lines each having a width less than 1/200ths of a centimeter in order that frequencies of 10,000 per second may be recorded individually. If the film moves at a speed less than 50 centimeters per second, the width of the record lines should be correspondingly reduced.

Since the sound record lines should be so narrow it will be seen that the quantity of light passing through the film at any moment is small. It is, therefore, of extreme importance that the intensity of the luminous source should be strong, as has been stated.

Further the necessity of maintaining the reproducing light constant, if a faithful reproduction of the sound is to be secured, is made clear by the fact that every undesired change in the intensity of illumination of the reproducing light varies the current produced by the photo cell. The variations of current produced by the photo cell correspond to the variations of light which pass through the film and these should correspond only to variations of recorded sound. Any change in the intensity of light emitted by the light source varies the sound which is reproduced by the loud speaker or other sound reproducing device, which is operated by the current produced by the photo cell.

Referring now to the drawing, the light source comprises an electric arc having a positive electrode 1 and a negative electrode 2 between which extends the arc indicated at 3. The electrodes may be of usual or any desired character such as carbon.

The end or face 4 of the positive electrode is or may be entirely luminous. The central portion of this face, or the central portion of the positive crater of the arc, as it is termed, is alone utilized as the light source. It possesses the highest intrinsic brightness of all the known luminous sources, that is to say, the highest luminous emission per unit of surface or area. Therefore, the use of this source ensures the illumination of the narrow record lines upon the film with the greatest possible brightness.

In addition, the positive crater of an electric arc possesses the property that its intrinsic brilliancy does not vary upon variations taking place in the strength of the current flowing across the arc. When the current flowing across the arc varies the area of the illuminated total crater surface increases or decreases in consequence but without changing in brilliancy. Only the central portion of the crater is utilized in the invention and, therefore, fluctuations of the total crater area exercise no disturbing effects, the portion of the luminous surface chosen remaining luminous during all variations of current strength which will be met in practice.

The light from the positive electrode and, to a greater or less extent, the light of the arc itself and the light from the negative electrode, pass through an illuminating optical system represented by the lens 5. The light passing through this lens is concentrated thereby and projected upon an opaque member 6 mounted in front of the sound record film 7, which latter is progressed at a uniform desired rate of speed during the reproduction of the record.

A narrow slit 8 is provided in member 6 through which the light with which the film is to be illuminated will pass. If the film moves closely adjacent to member 6, this slit 8 will be of a width substantially equal to that of each record line on the film. The light passing through slit 8 falls upon a light sensitive element, such as the photoelectric cell indicated at 9 and sets up a sound modulated current in the circuit of the cell indicated at 10.

The member 6 serves to screen all undesired illumination from the arc-discharge. The lens 5 is so chosen and so positioned that the image of the central portion of the positive crater of the arc will cover the whole of slit 8 at all times. The image of the central portion of the arc, upon member 6, is indicated by the dotted circle 11 in the figure, the image of the extreme outer edge of the luminous face of the positive electrode being indicated by the circle 12. It will be understood that the inner dotted circle 11 is shown merely for convenience in connection with the above extension since no demarcation between the central portion of the positive crater and the outer edge portion will actually appear in the image of the same as projected upon member 6. The image of the end portion of the negative electrode upon member 6 is indicated at 13 and the image of the arc passing between the positive and negative electrodes is indicated at 14. The various portions of the image, as described, would, of course, be clearly visible if member 6 were formed as a mirror, although they may not be so clearly visible upon the surface of an opaque member such as member 6.

It will be seen from the above that all the undesired portions of the light are prevented by member 6 from passing through slit 8 and falling upon the film, since only the light from the inner circle 11, corresponding to the central portion of the positive crater of the arc, can pass through the slit and fall upon the film.

What we claim is:

1. In apparatus for reproducing photographic sound records on a moving film, the combination of a light source comprising an electric arc having positive and negative electrodes, the positive electrode having a luminous face having a central portion of invariable brightness, an opaque member having a narrow slit therethrough, optical means for illuminating said slit with the light from said central positive electrode portion, so arranged that the light from all portions of said source other than said central positive electrode portion will at all times impinge upon said opaque member outside the edges of said slit, means for progressing a film carrying photographic sound records past said slit, on the side thereof opposite to said source, and a photo cell beyond said film, on which light passing through said film will impinge.

2. In apparatus for reproducing photographic sound records on a moving film, the combination of a light source comprising an electric arc having positive and negative electrodes, the positive electrode having a luminous face having a central portion of invariable brightness, means providing a narrow slit, means for constantly illuminating the whole of said slit with light from said central positive electrode portion, and for preventing light from all portions of said source other than said central positive electrode portion entering said slit, means for progressing a film carrying photographic sound records past said slit, on the side thereof opposite to said source, and a photo cell beyond said film, on which light passing through said film will impinge.

JOSEF ENGL.
HANS VOGT.
JOSEPH MASSOLLE.